Patented Nov. 29, 1932

1,889,125

UNITED STATES PATENT OFFICE

CHARLES H. MacDOWELL, OF CHICAGO, ILLINOIS, ASSIGNOR TO ARMOUR FERTILIZER WORKS, OF CHICAGO, ILLINOIS, A CORPORATION OF NEW JERSEY

PREPARATION OF A FERTILIZER INGREDIENT

No Drawing. Original application filed February 1, 1929, Serial No. 336,921. Divided and this application filed May 31, 1930. Serial No. 458,908.

My present invention relates to an improved and novel method or process of preparing and storing or transporting a fertilizer material or constituent, and concerns more particularly the solution of a fertilizer ingredient in an ammoniacal liquid, preferably liquid anhydrous ammonia, such ingredient, in some instances, having more or less explosive characteristics, such as ammonium nitrate.

One object of the invention, in its preferred manner of practice, is to reduce the vapor pressure of the liquid anhydrous ammonia by dissolving the explosive fertilizer ingredient therein, thus lessening or entirely eliminating the explosion hazard involved and allowing the solution, because of its diminished vapor pressure, to be stored or transported in containers or tanks capable of withstanding less pressure than that required for the liquid anhydrous ammonia by itself.

Accordingly, in carrying out the process, a concentrated fertilizer ingredient, such as ammonium nitrate, which by itself is dangerous during transportation, storage in bulk, and its incorporation in fertilizer mixtures, due to its well-known explosive properties, in proper amount, say twenty pounds, for example, is dissolved in thirty pounds of liquid anhydrous ammonia.

Such solution results in a satisfactory, concentrated fertilizer constituent, and a double advantage accrues from such procedure.

In the first place, the vapor pressure of the liquid ammonia is thereby substantially lessened or reduced, so that it may thereafter be safely held, during transportation or storage, in tanks or receptacles of less pressure-resisting capacity than would be needed for the untreated liquid ammonia.

This results in a material saving in the manufacture of the tanks or other containers which house such solution, because metal of lesser gauge thickness may be safely employed.

In the second place, because the dangerous ammonium nitrate is now in solution, it has been robbed of its perilous traits or unsafe qualities and may be stored, transported and used with comparative safety and security.

Although I have specifically mentioned liquid anhydrous ammonia and ammonium nitrate, it is to be understood that these have been presented by way of examples only, and the invention, as defined by the appended claims, is not necessarily limited and restricted to these particular materials.

In other words, the invention as presented in the following claims is not confined to the precise and exact details set forth, and modifications or changes may be resorted to without departure from the heart and essence of the invention and without the loss of any of its substantial benefits and advantages.

This application is a division of my co-pending patent application, Serial No. 336,921, fertilizer manufacture, filed February 1, 1929.

I claim:

1. The process of preparing and storing a fertilizer ingredient, consisting in reducing the vapor pressure of an ammoniacal liquid having a vapor pressure substantially above atmospheric by dissolving therein a fertilizer material containing nitrogen and storing such solution under its own normal reduced vapor pressure in a sealed container of sufficient strength to withstand such reduced pressure.

2. The process of preparing and storing a fertilizer ingredient, consisting in reducing the vapor pressure of liquid anhydrous ammonia by dissolving a material having fertilizer value therein and storing such solution under its own normal reduced vapor pressure in a sealed container of sufficient strength to withstand such reduced pressure.

3. The process of preparing and storing a fertilizer ingredient, consisting in reducing the vapor pressure of an ammoniacal liquid having a vapor pressure substantially above atmospheric by dissolving therein a fertilizer material containing nitrogen and, which has explosive properties, thereby also reducing the explosion hazard of such material, and storing such solution under its own normal reduced vapor pressure in a sealed container of sufficient strength to withstand such reduced pressure.

4. The process of preparing and storing a fertilizer ingredient, consisting in reducing the vapor pressure of liquid anhydrous ammonia by dissolving therein a material which is soluble in liquid anhydrous ammonia, which has explosive properties and which has fertilizer value, thereby also reducing the explosion hazard of such material, and storing such solution under its own normal reduced vapor pressure in a sealed container of sufficient strength to withstand such reduced pressure.

5. The process of preparing and storing a fertilizer ingredient consisting in reducing the vapor pressure of an ammoniacal liquid by dissolving ammonium nitrate therein, thereby also reducing the explosion hazard of such nitrate, and storing such solution under its own normal reduced vapor pressure in a sealed container of sufficient strength to withstand such reduced pressure.

6. The process of preparing and storing a fertilizer ingredient, consisting in reducing the vapor pressure of liquid anhydrous ammonia by dissolving ammonium nitrate therein, thereby also reducing the explosion hazard of such nitrate, and storing such solution under its own normal reduced vapor pressure in a sealed container of sufficient strength to withstand such reduced pressure.

In witness whereof I have hereunto set my hand.

CHARLES H. MacDOWELL.